United States Patent [19]

Hulsey

[11] Patent Number: 4,736,481
[45] Date of Patent: Apr. 12, 1988

[54] METHOD OF MANUFACTURING SCREW FASTENERS

[75] Inventor: Tom R. Hulsey, Wyomissing, Pa.

[73] Assignee: Construction Fasteners, Inc., Wyomissing, Pa.

[21] Appl. No.: 53,051

[22] Filed: May 22, 1987

[51] Int. Cl.⁴ .......................... B21H 3/02; B21K 1/56
[52] U.S. Cl. .................................................. 10/10 R
[58] Field of Search .................... 10/10 R, 27 R, 140, 10/141 F; 408/226, 227, 228, 229, 230; 411/383, 386, 387, 900

[56] References Cited

U.S. PATENT DOCUMENTS

| | | | |
|---|---|---|---|
| 398,912 | 3/1889 | Thomson | 10/27 R |
| 910,434 | 1/1909 | Thompson | 411/900 X |
| 1,262,975 | 4/1918 | Pierce | 10/27 R |
| 1,462,775 | 7/1923 | Trivelloni | 10/27 R |
| 2,153,702 | 4/1939 | Tighe | 10/27 R X |
| 2,406,327 | 8/1946 | Friedrich | 10/10 R |
| 2,525,258 | 10/1950 | Fabrizio | 10/141 F |
| 3,611,862 | 10/1971 | Walker | 10/27 R X |
| 3,924,508 | 12/1975 | DeCaro | 10/10 R X |

Primary Examiner—E. Michael Combs
Attorney, Agent, or Firm—Leonard M. Quittner

[57] ABSTRACT

A bi-metallic screw fastener blank for a self drilling and tapping screw and a process for making it are disclosed. The screw blank comprises a member made of a first material and has a head member and a shank member adjacent to the head to which is affixed by welding means a slug member made of a second hardenable material. After welding to the head member, the hardenable member leaves an annular groove at the weld interface having a diameter equal to the defined root diameter of the screw.

6 Claims, 1 Drawing Sheet

METHOD OF MANUFACTURING SCREW FASTENERS

CROSS-REFERENCE

There are no cross references to nor are there any related applications.

FEDERALLY-SPONSORED RIGHTS

The invention herein was made without any Federal sponsorship or contribution.

BACKGROUND OF THE INVENTION

1. The Field of the Invention

The field of the invention relates to an improved screw fastener blank and a method of manufacture therefor. The blank has a head and shank portion of corrosion resistant material to which is adhered and made integral therewith a drill slug portion of a different material.

2. Description of the Prior Art

U.S. Pat. Nos. 751,258 to Carstens (Feb. 2, 1904); 3,180,126 to Carlson (Apr. 27, 1965) and 3,978,760 to Muenchinger (Sept. 7, 1978) which teach self-tapping fasteners; U.S. Pat. Nos. 3,204,516 to Weiber (Sept. 7, 1965) and 3,207,024 to Sommer (Sept. 21, 1965) which teach fabrication of drill points on screw ends; U.S. Pat. Nos. 3,585,894 to Brown (June 22, 1971); 4,257,307 to Regensberger (Mar. 24, 1981) and 4,480,951 to Regensberger (Nov. 6, 1984) which teach fabrication of self-drilling and tapping screw fasteners; U.S. Pat. Nos. 1,765,516 to Whitner (June 24, 1930); 3,611,862 to Walker (Oct. 12, 1971) and 4,003,175 to Patry (Jan. 18, 1977) which teach the use of bi-compositional fasteners, connectors and parts generally and U.S. Pat. Nos. 910,434 to Thompson (Jan. 19, 1909) and 2,153,702 to Tighe (Apr. 11, 1939) which teaches fabrication of bi-metallic screw fasteners and U.S. Pat. No. 3,924,508 to DeCaro (Dec. 9, 1975) which teaches a bi-metallic drill screw.

The desirability of a bi-compositional screw fastener which is self-drilling and tapping has long been apparent. Such a fastener would embody the properties of each material where it is used. For example, the head and shank portions may be exposed to heat or a corrosive atmosphere, or require a desired finish which is exposed to view while the drill and unexposed portions might require hardness, thread forming capability or holding power but not require corrosion resistance or beauty.

Joinder of components of dissimilar materials, metals or alloys pose problems inherent in their differences. Thompson (U.S. Pat. No. 910,434) discusses the butt welding of the screw portion of a screw blank to be composed of, for example, brass to steel. U.S. Pat. No. 910,434 teaches that different conductivities can be overcome by reducing the contact surface area of the material with the higher conductivity inverse proportionately to the welding area of the material with the lower conductivity so that the heat of resistance welding will rise relatively more quickly in the part with poorer conductivity thereby effecting a sound weld. In addition to being inaccurate as to conductivity vs. surface area, such a process will inevitably create a flash of excess weld material in the vicinity of the weld interface, see U.S. Pat. No. 910,434, FIG. 2, which must be eliminated by grinding. This problem is not solved by Tighe (U.S. Pat. No. 2,153,702), p. 2, col 2, lines 13 and 14. See also, FIG. 3 of the present invention. The flash may be disposed of without grinding if the screw blank is cut with threads. In thread rolling such excesss is undesirable.

DeCarlo (U.S. Pat. No. 3,924,508) teaches a method of joinder which uses inertial or friction welding to overcome the problem of different conductivities. The process disclosed requires specialized equipment in manufacture to impart an extremely high speed rotational component to the part to be joined and one component part must have a formed recess in the fixed part to receive the welding flash.

The present invention accomplishes joinder with conventional butt welding equipment and leaves a blank suitable for thread rolling.

SUMMARY OF THE INVENTION

The invention described herein is summarized as a screw fastener blank formed from a screw member of a first composition having a head and shank and a welding surface opposite the head which is planar and at a right angle to the longitudinal axis of the blank and a drilling slug member of a second composition which may have formed on one end a drilling tip and on its welding end a cone. The screw member and slug are brought into welding contact and butt welded as the slug is moved longitudinally toward the screw portion. In welding, the cone compresses and dissolves into the material behind the planar surface to form a continuous screw blank leaving an annular groove at the screw/slug interface which is equal to the defined root diameter of the finished screw. Thereafter, the blank may be thread rolled with the weld interface overridden in the rolling process to expose a uniform surface defined by the root diameter. The slug portion may be hardened if a drill tip is formed thereon at any appropriate step.

An object of the invention is to provide a bicompositional screw fastener blank using conventional butt welding equipment.

A further object of the invention is to provide a screw blank which requires no secondary grinding or finishing.

A further object of the invention is to provide a process for manufacturing at high speed a blank for a bicompositional self-drilling and tapping screw.

DESCRIPTION OF DRAWINGS

The present invention may be better understood by reference to the drawings wherein six (6) figures are shown on one (1) sheet. The numbers shown on the drawings for the various parts of the invention are consistent throughout so that a number indicating a part in one drawing will indicate the same part in another drawing.

DESCRIPTION OF THE PREFERRED EMBODIMENT

Figure 1:
FIG. 1 shows a longitudinal view of typically a bi-metallic screw fastener made from a screw blank of the invention.
Figure 2A:
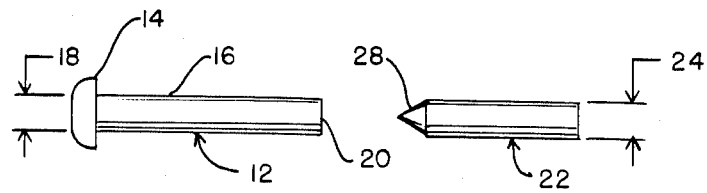
FIGS. 2 a-c show how the screw blank and drill slug are butt welded in the present invention.
FIG. 2d is a blow-up view of the weld interface.
Figure 2B:
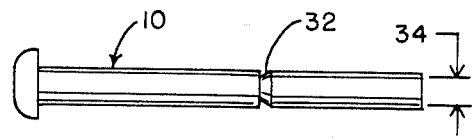
Figure 2C:
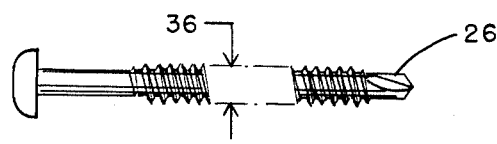
Figure 2D:
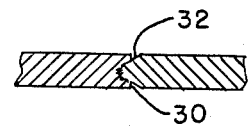
Figure 3:
FIG. 3 shows the butt welded screw blank and drill slug interface according to the prior art.

As to the product, the preferred embodiment is described as comprising a screw blank 10 with a screw member 12 of a non-corroding or corrosion resistant metal such as austenitic or 18-8 stainless steel having a head 14, a shank 16, a defined pre-rolling diameter 18 and having a planar welding surface 20 at a right angle to the longitudinal axis of the screw blank. The screw blank has a slug member 22 typically of a hardenable low carbon steel, of a defined length and a diameter 24 equal to the blank diameter, with a cone shaped lug 28 formed on one end and a drilling tip 26 which may be formed longitudinally on the other. See FIG. 2a.

Attention is directed to FIGS. 2 b–c. The slug is advanced cone side to the planar surface of the blank and butt welded at the interface 30 of the two members such that the cone is dissolved by the heat of welding into the blank with the slug adhering thereto, see FIG. 2b, leaving an annular groove 32 having a diameter 34 equal to the defined root diameter of the screw fastener. Thereafter the carbon steel end of the screw blank may have a drill tip formed thereon which may be hardened by annealing and quenching means. The screw blank may also be thread rolled to the defined root diameter and major diameter 36.

The process comprises of the steps of compressing together along their longitudinal axes cone to plane, a headed screw blank member made typically of 18-8 stainless steel to a slug member made typically of hardenable low carbon steel; applying an electric welding current to the members in contact; dissolving the cone into the screw member by means of the heat of welding; leaving an annular groove equal to the defined root diameter of the screw.

I claim:

1. A process for making a bi-compositional metallic screw fastener with a defined pre-rolling diameter comprising the steps of:

a. compressing in butting contact together along their longitudinal axes at an interface therebetween, a headed screw blank made of a first metallic composition and having a defined pre-rolling diameter and a planar surface opposite the head at a right angle to the screw blank's longitudinal axis and a cylindrical bar shaped slug made of a second metallic composition and having a diameter equal to the screw blank's diameter and having a cone shaped lug formed on one end, said interface being established between said cone shaped lug and said planar surface;
    b. applying an electric welding current to the screw blank and slug such that welding heat is generated;
    c. partially dissolving said cone shaped lug into the screw blank at said interface by means of the welding heat;
    d. while leaving an annular groove at said interface with a diameter equal to a defined root diameter of a finished screw; and
    e. continuously rolling screw threads on the slug and crew blank, said screw threads having a root diameter equal to the diameter of said annular groove, thereby forming a finished, bi-compositional screw fastener.

2. A process for making a screw blank as in claim 1 wherein the first composition is corrosion resistant.

3. A process for making a screw blank as in claim 2 wherein the corrosion resistant composition is austenitic steel.

4. A process for making a screw blank as in claim 3 wherein the austenitic steel is 18-8 stainless steel.

5. A process for making a screw blank as in claim 1 wherein the second composition is hardenable.

6. A process for making a screw blank as in claim 4 wherein the hardenable composition is low carbon steel.

* * * * *